Sept. 17, 1929.     E. R. EVANS     1,728,180
FRONT WHEEL BRAKE
Filed Feb. 26, 1923     2 Sheets-Sheet 1
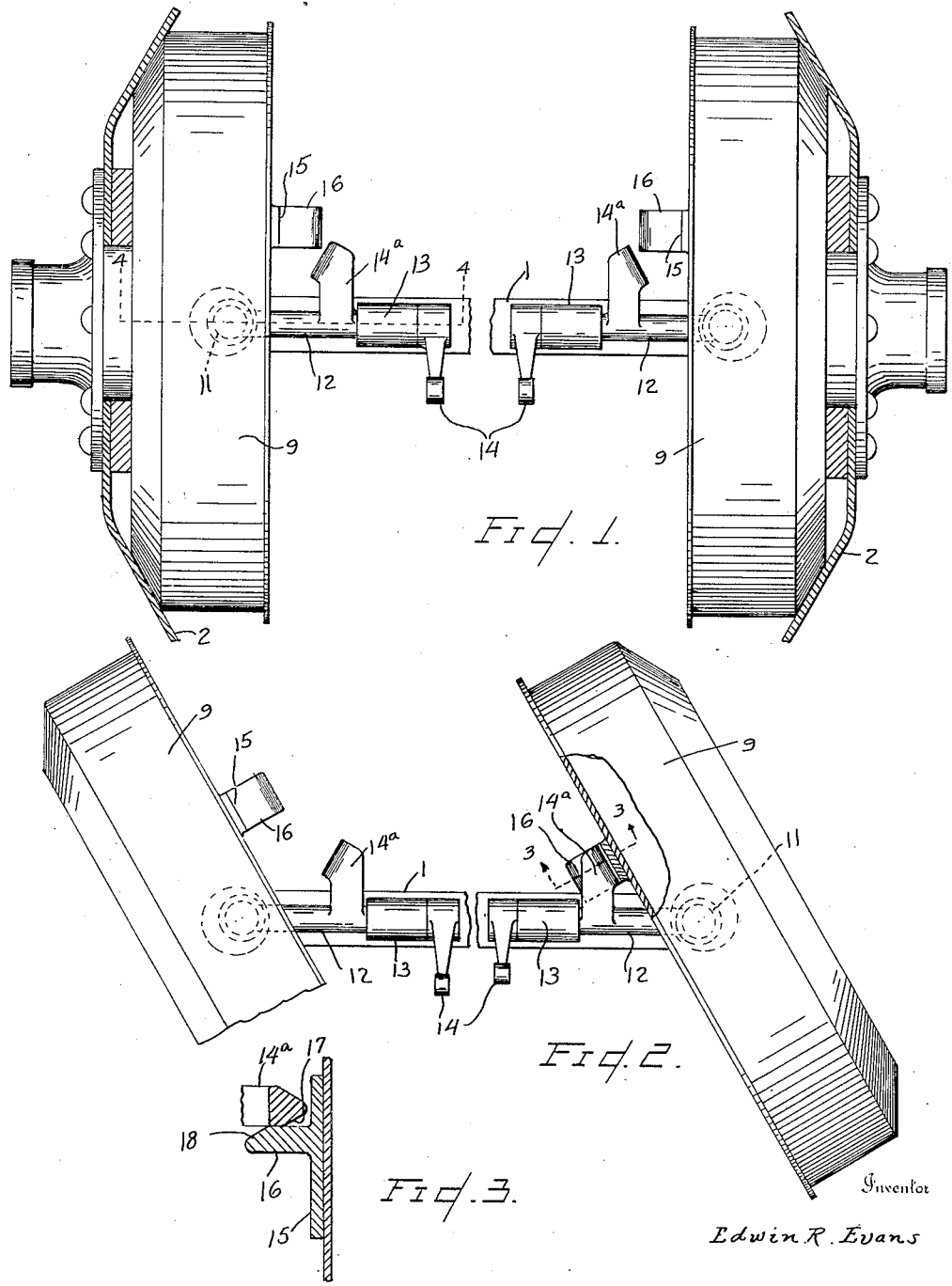
Inventor
Edwin R. Evans Sept. 17, 1929.  E. R. EVANS  1,728,180
FRONT WHEEL BRAKE
Filed Feb. 26, 1923   2 Sheets-Sheet 2

Inventor
Edwin R. Evans
By Whittemore, Hulbert, Whittemore, + Belknap
Attorneys

Patented Sept. 17, 1929

1,728,180

UNITED STATES PATENT OFFICE

EDWIN R. EVANS, OF DETROIT, MICHIGAN

FRONT-WHEEL BRAKE

Application filed February 26, 1923. Serial No. 621,410.

The invention relates to front wheel brakes for motor vehicles.

In the present state of the art, mechanisms of various sorts are well known for applying brakes to the front wheels of motor vehicles independently of the steering movement of said wheels. Such mechanisms are open to the objection that the driver cannot properly control a turning movement of his vehicle when both front brakes are applied; that is to say, if, when a vehicle is making a turn, at least one of the front wheels thereof is not free to rotate, said vehicle is responsive almost entirely to its own momentum as regards its direction of movement, whereas, if one of said wheels is permitted to turn, a considerable degree of steering control may be exercised.

It is the object of the present invention to provide means associated with a front wheel brake mechanism to automatically prevent application of the brake to the outer front wheel when a vehicle is making a turn of less than a predetermined radius.

In the drawings:—

Figure 1 is a plan view of a pair of front wheels equipped with the improved brake mechanism, the wheels being shown in position for substantially straight travel and the corresponding position of the automatic control means being shown.

Figure 2 is a similar view showing the wheels positioned to make a turn and the brake mechanism correspondingly positioned to exercise an automatic control;

Figure 3 is a section on line 3—3 of Figure 2;

Figure 4:
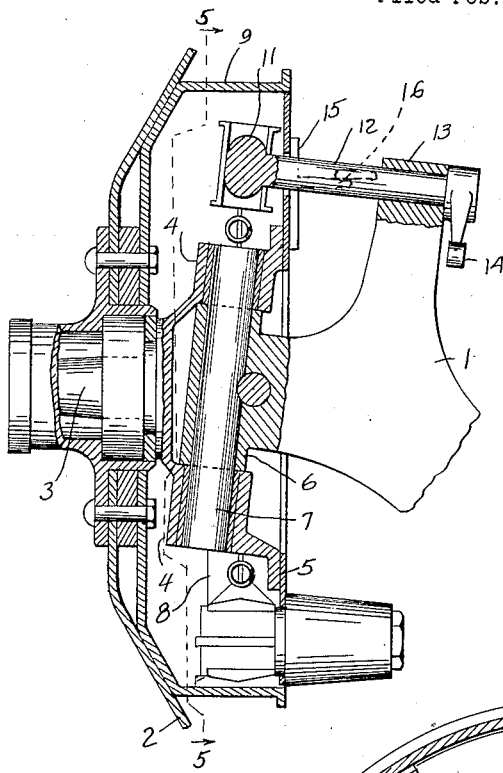
Figure 4 is a section on line 4—4 of Figure 1.
Figure 5:
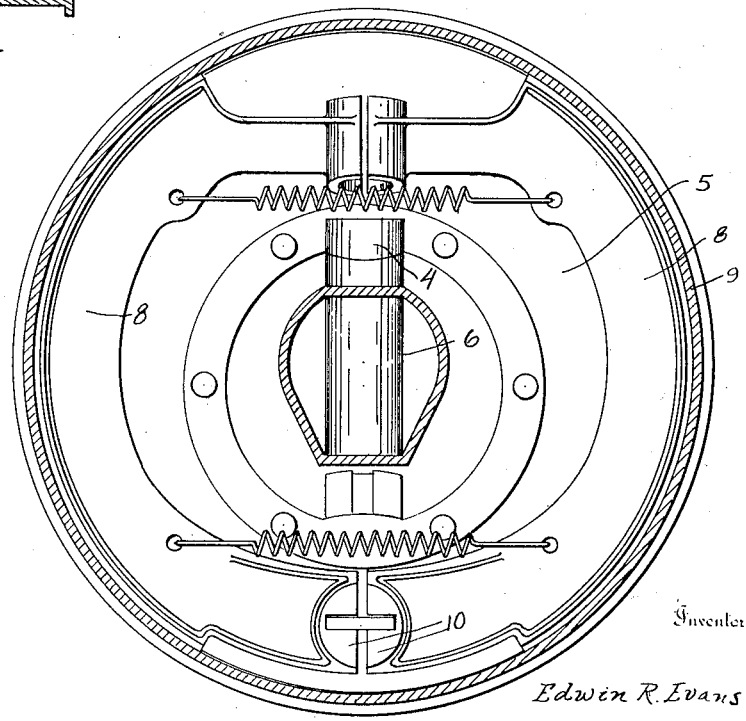
Figure 5 is a section on line 5—5 of Figure 4.

In these views, the reference character 1 designates the front axle of a vehicle and 2 the corresponding wheels. A description of the mounting of one of said wheels will suffice for both. The spindle 3, upon which the wheel 2 rotates, forms part of a unit swiveled for steering movement, said unit further comprising a pair of bearings 4 and a plate 5 rigidly secured to said bearings. A bearing 6, integral with the axle, is engaged between the bearings, 4 and a pin 7 connects the bearings 4 and 6 to establish a swivel axis for steering movement. The plate 5 mounts a pair of complementary semi-circular brake shoes 8 interiorly engageable with a brake drum 9 rigidly carried by the wheel 2. The lower ends of said brake shoes engage a common pivotal support 10 carried by the plate 5 and between the upper ends of said shoes there is engaged a cam 11 upon a rock shaft 12 journaled in a bearing 13 upon the axle. An arm 14 fast upon the inner end of the rock shaft 12 is equipped by any suitable mechanism (not shown) to rock said shaft and the cam 11 carried by said shaft serves to spread the brake shoes 8 and frictionally engage the latter with the brake drum 9. As so far described, the construction is not new, being more fully described in applicant's copending application, Serial Number 607,341.

The present invention consists in mounting fast upon the rock shaft 12 an arm $14^a$ preferably integral with said shaft and projecting in a substantially forward direction. Said arm is adapted to coact with a bracket 15 mounted fast upon the upper portion of the plate 5 and formed with the projecting lug 16 which, when the corresponding wheel 2 is subjected to a sufficient steering movement, is shifted into the path traveled angularly by the arm $14^a$ upon rocking of the shaft 12. That is to say, if it be attempted to apply the front brakes while the forward wheels are turned for steering purposes, as shown in Figure 2, the arm $14^a$ will swing downwardly and will encounter the lug 16, the latter acting as a stop preventing sufficient rotative actuation of the shaft 12 to accomplish an effective application of the brake of the corresponding wheel. It is evident from Figure 2, however, that this restraining effect is exercised only upon the brake of the wheel which is outermost with respect to the turn being made, the innermost wheel being so turned as to increase the clearance space between the lug 16 and the arm $14^a$ associated with said wheel.

If the driver, after having applied the brakes to the front wheels, subjects said wheels to a steering movement of sufficient angle to engage the lug 16 of the outer wheel with the corresponding arm 14ª, said lug will shift said arm upwardly and thereby effect a release rocking movement of the rock shaft 12. To permit this control of the arm 14ª by the lug 16, the free extremity of said arm has its lower face beveled, as indicated at 17 in Figure 3, and the top face of the lug 16 is correspondingly beveled adjacent the free end of said lug, as indicated at 18. Thus, if the arm 14ª lies in the path of angular travel of the lug 16, when the corresponding wheel is subjected to steering movement, the beveled faces 17 and 18 will coact to permit the lug 16 to ride under the arm 14ª forcing the latter rotatively upward.

The described automatic control device permits a driver to exercise a more complete control of his vehicle when occasion arises to apply a front wheel braking effect while a turn is being made or in case necessity arises for making a turn after an application of front wheel braking pressure.

What I claim as my invention is:—

1. In a brake mechanism, the combination with a vehicle wheel swiveled for steering movement, of means for applying a braking force to said wheel, and means effective only after a predetermined angular steering movement of the wheel to restrain application of the braking force.

2. In a brake mechanism, the combination with a vehicle wheel swiveled for steering movement, of means for applying a braking force to said wheel, and a restraining means automatically taking effect upon said brake means only after a predetermined swivel steering movement of the wheel.

3. In a brake mechanism, the combination with an axle, of a pair of steering wheels mounted upon said axle, means for applying a braking force to said wheels, and automatic means restraining the brake applying means of the outer of said pair of wheels only after both wheels are turned through a predetermined angle for steering purposes.

4. In a brake mechanism, the combination with an axle and a vehicle wheel, of a member rotatively mounting said wheel upon said axle for steering movement, a brake for said wheel, an actuating element for said brake, and a stop carried by said swivel member engaging in the path of said actuating member upon a predetermined swivel movement of the wheel carrying member to restrain the actuating member from fully applying the brake.

5. In a brake mechanism, the combination with an axle and a vehicle wheel, of a member rotatively mounting said wheel swivelly carried by the axle for steering movement, a brake associated with said wheel, a rock shaft for applying said brake, an arm upon said rock shaft, and a stop upon said swivel member movable through a predetermined swivel movement of said member into the path of said arm to restrain brake-applying rotation of said rock shaft.

6. In a brake mechanism, the combination with an axle of a vehicle wheel, a member rotatively mounting said wheel swiveled upon the axle for steering movement, a brake for said wheel, a control member for said brake, and means carried by said swiveled member engageable with the brake control member upon a predetermined swivel movement of said member to automatically release the brake.

7. In a brake mechanism, the combination with an axle and a vehicle wheel, of a member rotatively mounting the vehicle wheel swiveled for steering movement upon the axle, a brake for said wheel, an actuating element for said brake mounted independently of the steering movement of the wheel, and automatic control elements for said brake respectively carried by said swiveled member and actuating element and engageable in a predetermined position of swivel movement of the wheel.

8. In a brake mechanism, the combination with a vehicle wheel, of a member rotatively mounting said wheel and swiveled for steering movement about a substantially vertical axis, of a brake for said wheel, an operating element for said brake mounted independently of said swiveled member, and an automatic control element for the brake carried by the swivel member and engageable with said control element upon a predetermined swivel movement, one of said engageable elements having a beveled face adapted to ride on the other element to release the brake upon such engagement.

9. In a brake mechanism, the combination with a vehicle wheel swiveled for steering movement, of means for applying a braking force to said wheel, and a pair of coacting control elements for the last named means spaced apart in the position of the wheel corresponding to rectilinear travel of the vehicle and movable into engagement upon a predetermined angular steering movement of the wheel to restrain application of the braking force.

10. In a brake mechanism, the combination with a vehicle wheel swiveled for steering movement, of means for applying a braking force to said wheel including a control element pivotal about a substantially horizontal axis, and a restraining element movable with the wheel about its axis of steering movement entering into restraining engagement with said pivotal control member only after a predetermined travel about said steering axis.

11. In a brake mechanism, the combination with a pair of opposite steering wheels of a vehicle, of means for applying a braking force to said wheels, means associated with each of said wheels for applying a braking force thereto including an actuating element and a restraining element for said braking means associated with each of said wheels effective upon a predetermined steering movement of the wheels to engage the brake control element of the outermost of said wheels to limit effective travel of said control member.

12. In a brake mechanism, the combination with a vehicle wheel swiveled for steering movement, of a brake for said wheel, and means controlled by a steering movement of said wheel for restraining the application of the brake.

13. In a brake mechanism, the combination with a vehicle wheel swiveled for steering movement, of a brake for said wheel, a normal control mechanism for said brake, and a restraining means for said control mechanism effective through steering movement of the wheel.

14. A vehicle comprising, in combination, a pair of swivelled steering wheels, a brake for each of said wheels, mechanical connections for operating the brakes, and means controlled by swivelling movement of the steering wheels and effective to render the connections to one of the brakes inoperative.

15. A vehicle comprising, in combination, a pair of swivelled steering wheels, a brake for each wheel, and means operated by swivelling movement of the wheels to steer the vehicle to render inoperative the brake which is on the outer side of the turn without affecting the brake which is on the inner side.

16. A vehicle which has a fixed axle, a knuckle swivelled on the axle, and a wheel rotatably mounted on the knuckle, and which comprises, in combination, a brake drum carried by the wheel, retarding means carried by the knuckle in position to cooperate with said drum, and means operated by relative angular movement of the axle and the knuckle to render the retarding means inoperative.

17. In a brake mechanism for vehicles, a front axle, a knuckle at each end, a wheel carried by each knuckle, a brake drum on each wheel, a brake band ofr each brake drum, a separate brake lever for operating each brake band, separate rotary bars for operating each brake lever, and means for rotating both bars and thereby applying both brakes to their respective brake drums when the vehicle is moving in a straight line and for causing only one bar to apply a brake when the vehicle is moving on a substantial curve.

18. In a brake mechanism for vehicles, a front axle, a knuckle at each end, a wheel carried by each knuckle, a brake drum on each wheel, a brake band for each brake drum, a separate brake lever for operating each brake band, separate rotary bars for operating each brake lever, means for rotating both bars in brake applying direction when the vehicle is moving in a straight line, and means for rendering said rotating means inoperative as to one brake when the vehicle is moving on a substantial curve.

In testimony whereof I affix my signature.

EDWIN R. EVANS.